May 29, 1928.
H. D. CASEY
1,671,626
COMBINATION FOOT BRAKE AND CENTER PIN FOR LOCOMOTIVE CRANES
Filed Aug. 11, 1926 5 Sheets-Sheet 2
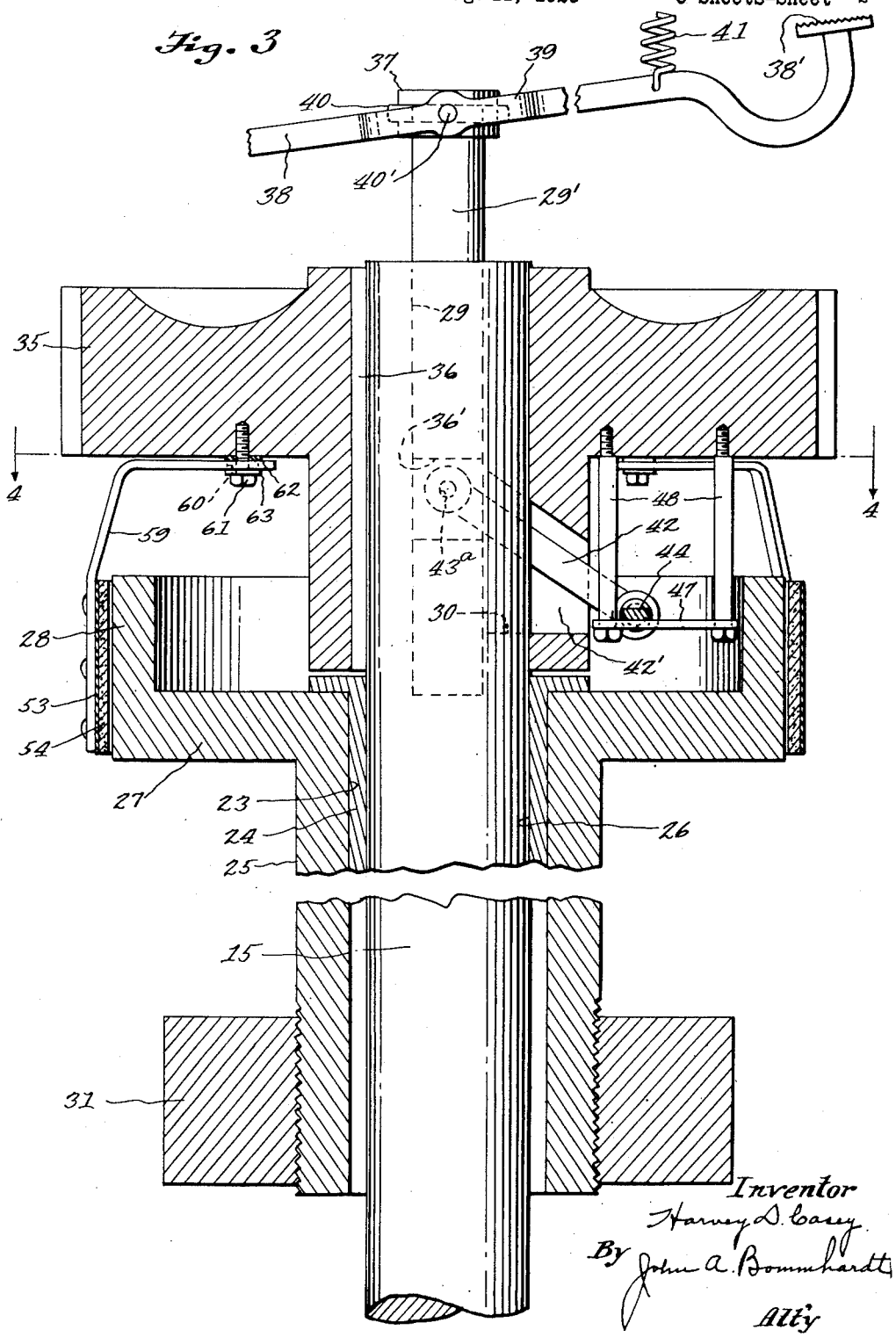

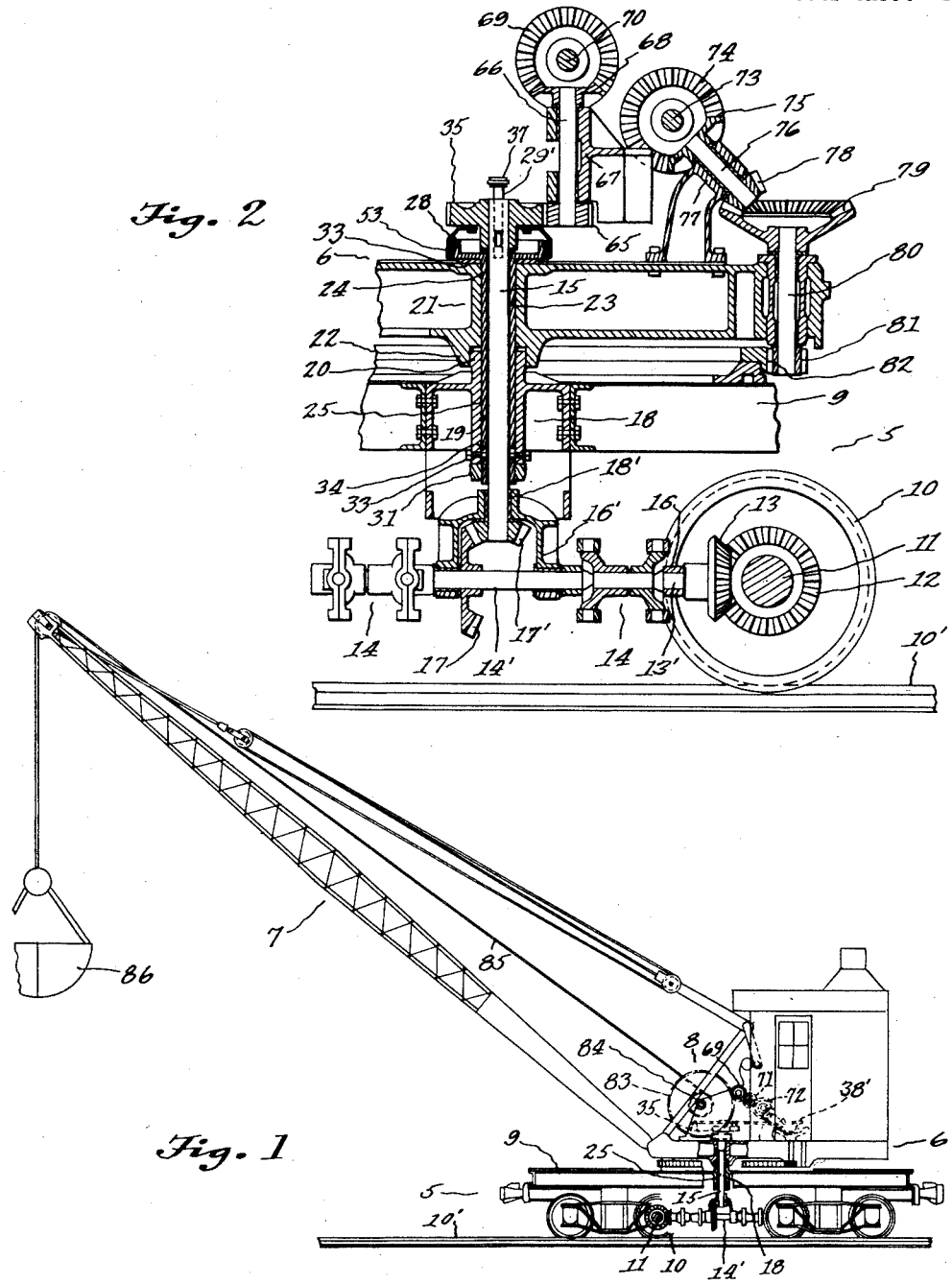

May 29, 1928.  
H. D. CASEY  
1,671,626  
COMBINATION FOOT BRAKE AND CENTER PIN FOR LOCOMOTIVE CRANES  
Filed Aug. 11, 1926  5 Sheets-Sheet 3

Inventor  
Harvey D. Casey  
By John C. Boumhardt  
Att'y

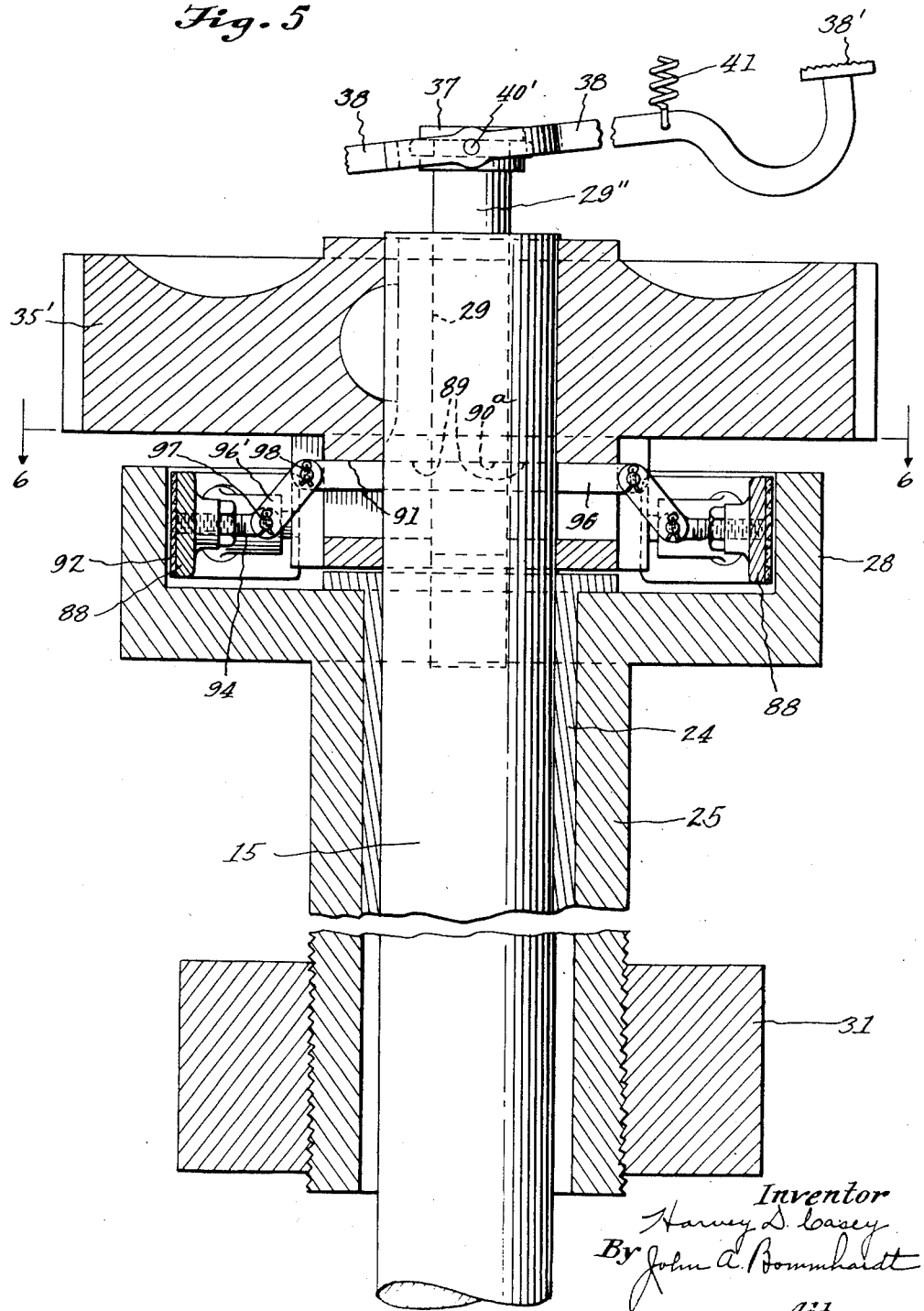

May 29, 1928.　　　　　　　　　　　　　　　　　　　　1,671,626
H. D. CASEY
COMBINATION FOOT BRAKE AND CENTER PIN FOR LOCOMOTIVE CRANES
Filed Aug. 11, 1926　　　5 Sheets-Sheet 5
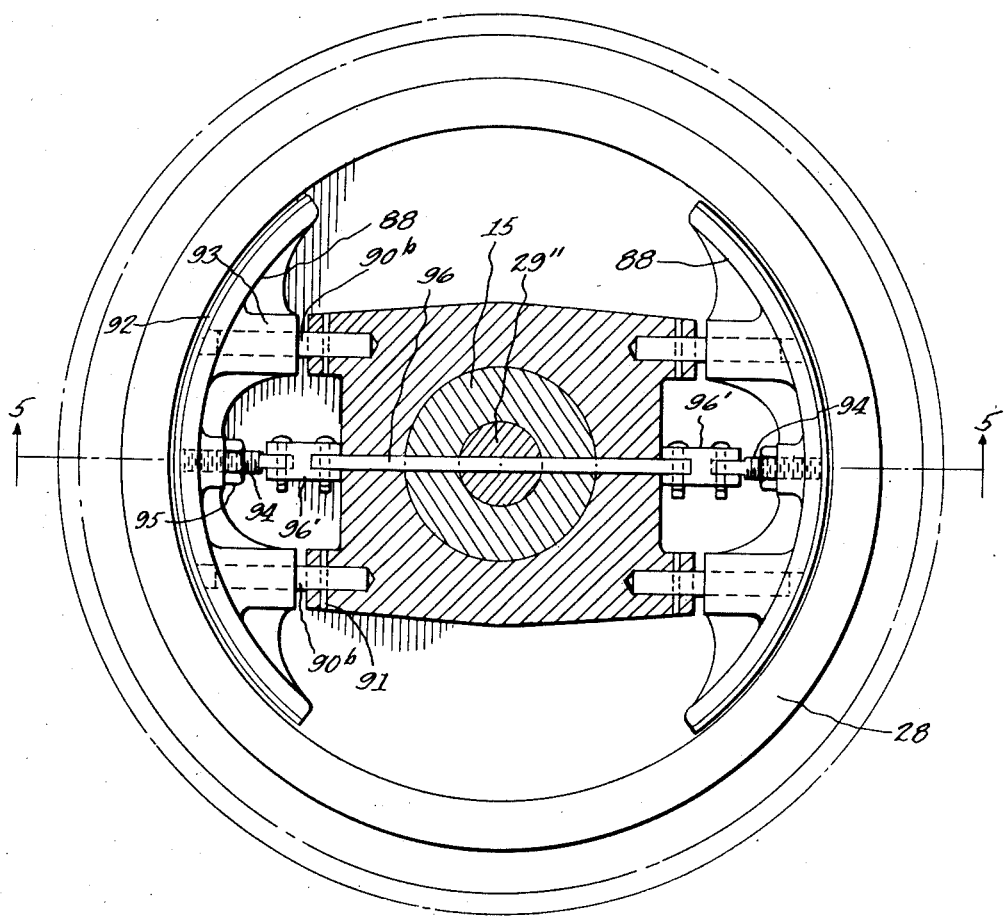
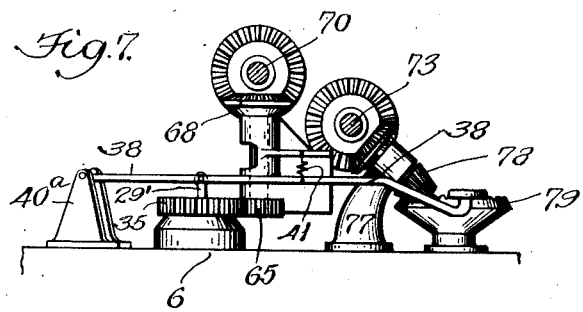
Inventor
Harvey D. Casey
By John A. Bommhardt
Att'y Patented May 29, 1928.

1,671,626

UNITED STATES PATENT OFFICE.

HARVEY D. CASEY, OF CLEVELAND, OHIO.

COMBINATION FOOT BRAKE AND CENTER PIN FOR LOCOMOTIVE CRANES.

Application filed August 11, 1926. Serial No. 128,581.

This invention relates to new and useful improvements in combination foot brakes and center pins for cranes and more particularly steam locomotive cranes providing simple and convenient means for mechanically foot braking the truck travel of the crane, facilitating the operation and maneuvering thereof. Other objects and features of the invention will be hereinafter pointed out and described.

In the drawings:

Fig. 1 is a side elevation of a locomotive crane equipped with a foot brake.

Fig. 2 is an enlarged detail view of the crane transmission mechanism.

Fig. 3 is another enlarged detail sectional view of the foot brake and center pin on line 3—3 of Fig. 4.

Fig. 5 is a detail sectional view of a modified form of foot brake on line 5—5 of Fig. 6.

Fig. 6 is a section on line 6—6 of Fig 5.

Fig. 7 is a detail in side elevation of parts on the turn-table.

Figure 4:
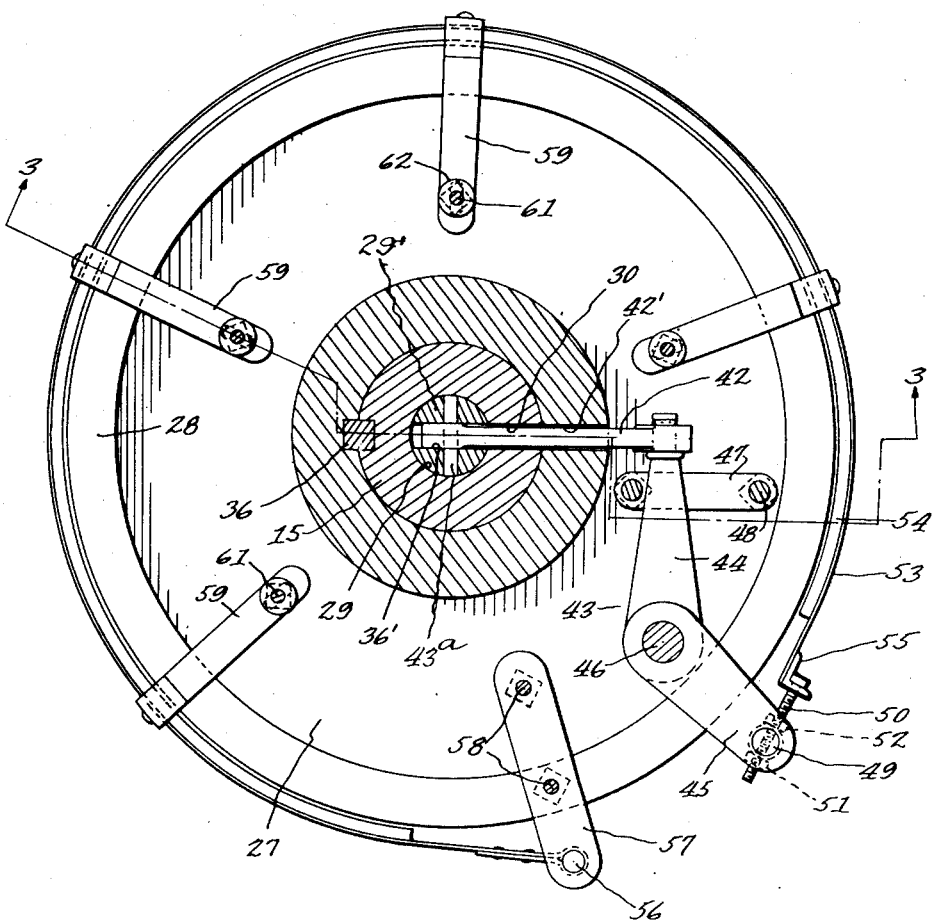
Fig. 4 is a section on line 4—4 of Fig. 3.

Referring specifically to the drawings, the locomotive crane has the usual travel truck 5, turntable 6, boom 7 and steam driven power mechanism 8. The truck frame 9 is mounted on wheels 10 for tracks 10'; having axles 11 with beveled gears 12 driven by driving gears 13 on shafts 13' connected by universal joints 4 to a shaft 14' the shafts journaling in bearing brackets 16 and 16'. A beveled gear 17 on shaft 14' meshes with a beveled gear 17' on a central vertical travel shaft 15 having its lower end journaled as at 18' in bracket 16' which is carried by a center truck casting 18 having a vertical center bore 19 and top stud portion 20 on which is pivoted the female extension 22 of the rotating bed casting 21 having a central bore 23. The upper end of shaft 15 is journaled in a bearing 24 mounted in the concentric bore 26 of a center pin 25 provided in truck and bed casting bores 18 and 23. The top of center pin 25 has a flange 27 with a vertical annular wall 28 providing a brake drum, the flange seating on wearing ring 33 on bed casting 21 and the lower end of the pin is externally threaded to receive a nut 31, for holding the turntable on the travel truck. The center pin is locked against rotation by set screws 33 engaging slots 34.

The top of shaft 15 has a spur gear 35 secured thereto by a key 36 with the hub slotted as at 42' the shaft having a central bore 29 and slot 30. A plunger 29' slidably mounted in bore 29 has a grooved collar 37 engaged by a split collar 40 having the studs 40' thereof journaled in a yoke 39 on foot lever 38 pivoted on a suitably mounted bracket 40ª and having a conveniently disposed treadle 38'. The lever 38 is normally held up by a spring 41 for holding the brake band, to be hereinafter described, in inoperative position. The lower end of plunger 36 is slotted as at 36' having the end of a toggle link 42 pivoted therein by pin 43ª. The other end of link 42 is connected to the arm 44 of a lever 43 having an outwardly extending arm 45 fulcrumed on a stud 46 secured to the bottom of gear 35. The lever arm 44 is slidably supported by a thrust plate 47 carried on stud bolts 48 secured to bottom of gear 35. The lever arm 45 has a depending pin 49 in which is screw threaded the brake band adjusting bolt 50 of brake band 53 having a brake lining 54 secured thereto. The bolt 50 is locked by lock nuts 51 and 52, the head thereof holding an angle iron 55 secured to an end of band 53. The opposite fixed end of band 53 is secured to a pin 56 depending from an arm 57 secured by bolts 58 to the bottom of gear 35. The band 53 is supported at its intermediate points by brackets 59 adjustably mounted on bolts 61 threaded in the bottom of gear 35, the brackets having slots 60 and are spaced by washers 62 and 63.

The gear 35 is driven by a pinion 65 carried on a shaft 66, journaled in bracket 67, having a gear 68 meshing with a gear 69, on the steam piston crank shaft 70, which drives through an intermediate gear 71 a gear 72 on shaft 73 having a turnable rotating clutch thereon with a bevelled gear 74 meshing with bevelled gear 75 on shaft 76 journaled in bracket 77, shaft 76 having a bevelled gear 78 meshing with bevelled gear 79 on shaft 80 having a driving pinion 81 for turning the turntable 6 meshing with a circular toothed rack 82 fixed to truck frame 5. The gear 69 drives a spur gear 83 on hoist drum shaft 84 having a hoist drum thereon for winding the cable 85 of the clamshell bucket 86.

The crane truck is moved forward or backward by the steam piston cranks, not shown, which turn shaft 70, gears 68 and 69, shaft 66, gears 65 and 35, central travel shaft 15, gears 17' and 17, shaft 14', couplings 14, shafts 13', gears 13 and 12, shafts 11 to the wheels which travel on tracks 10'. To stop the truck travel the travel clutch not shown, is shifted, idling shaft 70 and the foot brake is applied by putting a foot on tread 38', pressing lever 38 and post 29' downward, the toggle link 42 moving the lever arm 44 outwardly. The opposite lever arm 45 through pin 49 and bolt 50 draws the external brake band with the degree of holding friction required upon brake drum 28 of center pin 25, stopping the motion and securely holding the center drive shaft and braking the wheels, through the connecting gears and shafts.

A modified form of combination foot brake and center pin shown in Figs. 5 and 6 has internal friction brake shoes 88 adapted to engage and hold against the inner wall of the drum 28 of center pin 25 which has a lock nut 31 and a bushing 24 set therein providing an upper bearing for central shaft 15 having a bore 29 with oppositely disposed slots 89. A plunger 29'' in bore 29 having a slot 90ª is actuated by foot tread 38' of lever 38 similar to that shown in the preferred form. A cross bar 96 is retained in slot 80, extending oppositely through elongated shaft slots 89 and slots 91 in the hub of gear 35'. The hub of gear 35' has oppositely disposed pairs of spaced studs 90ᵇ secured by pins 91. The brake shoes 88 have linings 92 and bosses 93 which are slidably mounted on studs 90ᵇ. Brake shoe adjusting eye bolts 94 screw threaded into the shoes 88 and locked by lock nuts 95 are connected by toggle links 96' pinned as at 97 to the eye bolts 94 and at 98 to the ends of cross bar 90.

When the foot brake is applied to the vertical travel shaft braking the truck wheels through the intermediate gearing and shafts, by pressing tread 38' with the foot, pushing plunger 29'' and cross bar 96 down straightening links 96' forcing the shoes 88 into friction holding engagement with the stationary center pin drum 28. Upon releasing the foot, spring 41 pulls the lever 38, plunger 29' and cross bar 90 up, disengaging the brake shoes.

While I have shown and described certain forms of the invention obviously various embodiments, may be made together with changes in the details of construction, falling within the spirit of the appended claims.

I claim:

1. The combination of a turntable, a vertical shaft at the axis of the turntable, a brake drum around the shaft and fixed relatively to the turntable, a brake member engageable with the drum, a plunger slidable lengthwise in the shaft at the axis thereof, and an operating connection between the plunger and the brake member.

2. The combination stated in claim 1, said shaft having a bore at the top in which the plunger slides and a slot communicating with said bore, the connection extending thru said slot.

3. The combination of a turntable, a vertical shaft at the axis of the turntable, gearing between the shaft and the turntable, a fixed brake drum on the turntable and extending around the shaft, the shaft having a longitudinal bore at its upper end and a slot in the side communicating with said bore, a plunger slidable lengthwise in the bore, a brake member engageable with the drum, and an operating connection between the inner end of the plunger and said brake member, said connection extending thru the slot.

4. The combination of a turntable, a vertical shaft at the axis of the turntable, a fixed brake drum on the turntable and extending around the shaft, a brake member engageable with said shaft, means to actuate said brake member including an element slidable axially in the shaft and operable from the top of the turntable.

5. The combination of a turntable, a vertical shaft at the axis thereof, a fixed brake drum on the turntable and extending around the shaft, the latter having a slot and bore therein, gearing between the turntable and shaft, a brake member engageable with said drum, a plunger slidable in the bore, an operating connection between the plunger and the brake member, said connection extending thru said slot, and a lever mounted on the turntable and connected to the outer end of the plunger.

6. The combination of a turntable, a vertical shaft at the axis thereof, a fixed brake drum on the turntable and extending around the shaft, a brake member rotatable with said shaft and engageable with the drum, and means to actuate said brake member from the top of the turntable, including a plunger slidable axially in the shaft and operatively connected to the brake member.

7. The combination stated in claim 6, the end of said plunger projecting above the end of the shaft, and a shifting device mounted on the turntable and connected to the exposed end of the plunger.

In testimony whereof, I do affix my signature.

HARVEY D. CASEY.